United States Patent
Shimazu

(10) Patent No.: US 8,934,147 B2
(45) Date of Patent: Jan. 13, 2015

(54) DIGITIZING APPARATUS FOR GENERATING PORTABLE DATA FILE BY COMPILING IMAGE DATA OF PAGES INTO SINGLE FILE, HAVING PAGE NUMBER CONVERSION UNIT FOR CONVERTING PAGE NUMBERS INTO ELECTRONIC DOCUMENT PAGE NUMBERS

(71) Applicant: KYOCERA Document Solutions Inc., Osaka (JP)

(72) Inventor: Kozo Shimazu, Osaka (JP)

(73) Assignee: KYOCERA Document Solutions Inc., Osaka-Shi (JP)

( * ) Notice: Subject to any disclaimer, the term of this patent is extended or adjusted under 35 U.S.C. 154(b) by 0 days.

(21) Appl. No.: 13/851,350

(22) Filed: Mar. 27, 2013

(65) Prior Publication Data

US 2013/0258419 A1 Oct. 3, 2013

(30) Foreign Application Priority Data

Mar. 30, 2012 (JP) ................................ 2012-080486

(51) Int. Cl.
```
H04N 1/40      (2006.01)
G06K 9/00      (2006.01)
G06F 17/21     (2006.01)
G06F 17/20     (2006.01)
G06K 9/46      (2006.01)
```
(52) U.S. Cl.
CPC .......... *G06K 9/00469* (2013.01); *G06F 17/217* (2013.01)
USPC ............ 358/448; 358/403; 715/251; 382/190

(58) Field of Classification Search
None
See application file for complete search history.

(56) References Cited

U.S. PATENT DOCUMENTS 5,524,071 A * 6/1996 Yokomizo .................... 382/284
5,680,198 A   10/1997 Ohnishi (Continued)

FOREIGN PATENT DOCUMENTS

| JP | 06-181516    | * | 6/1994 |
| JP | H06-181516 A |   | 6/1994 |
| JP | H10-162126 A |   | 6/1998 |

(Continued)

OTHER PUBLICATIONS

Notice of Reasons for Rejection issued to JP Application No. 2012-080486, mailed Jun. 3, 2014.

*Primary Examiner* — Steven Kau

(74) *Attorney, Agent, or Firm* — Knobbe Martens Olson & Bear LLP

(57) ABSTRACT

A page numbering unit assigns an electronic document page number to each of image data of a plurality of pages stored in a storage unit. An image analysis unit extracts a page number described in each of the image data of the plurality of pages stored in the storage unit. The image analysis unit identifies image data that describes page numbers for searching for other pages, from among the image data of the plurality of pages stored in the storage unit. A page number comparator compares the assigned electronic document page number with the extracted page number, for each of the image data of the plurality of pages. A page number conversion unit converts the page numbers for searching into the corresponding electronic document page numbers, based on a result of comparison by the page number comparator.

5 Claims, 6 Drawing Sheets

(56) References Cited

U.S. PATENT DOCUMENTS

| | | | | |
|---|---|---|---|---|
| 5,940,583 | A | * | 8/1999 | Taira et al. ............. 358/1.15 |
| 7,210,102 | B1 | * | 4/2007 | Gordon et al. ........... 715/253 |
| 2006/0282760 | A1 | | 12/2006 | Tanaka |
| 2008/0114757 | A1 | * | 5/2008 | Dejean et al. ............ 707/6 |

FOREIGN PATENT DOCUMENTS

| | | | |
|---|---|---|---|
| JP | 2006-004050 | * | 1/2006 |
| JP | 2006-004050 A | | 1/2006 |
| JP | 2006-350551 | * | 12/2006 |
| JP | 2006-350551 A | | 12/2006 |

* cited by examiner

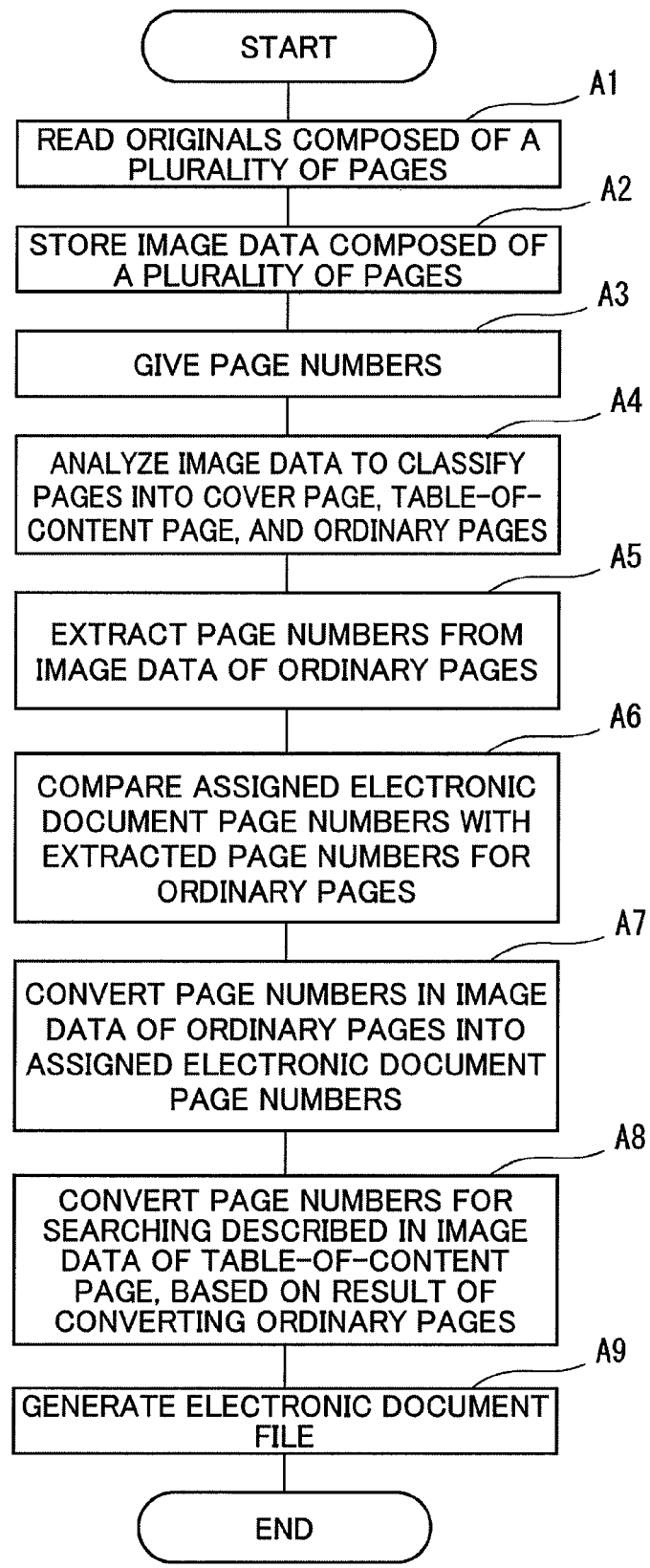

DIGITIZING APPARATUS FOR GENERATING PORTABLE DATA FILE BY COMPILING IMAGE DATA OF PAGES INTO SINGLE FILE, HAVING PAGE NUMBER CONVERSION UNIT FOR CONVERTING PAGE NUMBERS INTO ELECTRONIC DOCUMENT PAGE NUMBERS

INCORPORATION BY REFERENCE

This application is based on and claims the benefit of priority from Japanese Patent Application No. 2012-080486, filed on Mar. 30, 2012, the content of which is incorporated herein by reference.

BACKGROUND

The present disclosure relates to a digitizing apparatus, which reads image data of originals of a plurality of pages, and which generates an electronic document file by compiling the read image data of the plurality of pages into a single file.

A document digitizing apparatus is known, which is capable of adding some kind of title to each page, and adding link information that indicates association among individual pages, in a case in which image data of originals of a plurality of pages such as a book and a magazine is read and an electronic document file is generated by compiling the read image data of the plurality of pages into a single file. Since the title and link information are added to the electronic document file that is generated by the digitizing apparatus, the added title and link information facilitate searching when browsing the file later on.

However, the conventional art has a problem that an operation of generating an electronic document file is complicated, since a user has to manually input a title and link information when generating the electronic document file.

SUMMARY

A digitizing apparatus of the present disclosure generates an electronic document file by compiling image data of a plurality of pages into a single file. The digitizing apparatus includes a page numbering unit, a page number extraction unit, a page number comparator, a search page identification unit, and a page number conversion unit. The page numbering unit assigns an electronic document page number to each of the image data of the plurality of pages. The page number extraction unit extracts a page number described in each of the image data of the plurality of pages. The page number comparator compares the electronic document page number assigned by the page numbering unit with the page number extracted by the page number extraction unit, for each of the image data of the plurality of pages. The search page identification unit identifies the image data that describes page numbers for searching for other pages, from among the image data of the plurality of pages. The page number conversion unit converts the page number for searching, which is described in each of the image data identified by the search page identification unit, into the corresponding electronic document page number, based on a result of comparison by the page number comparator.

BRIEF DESCRIPTION OF DRAWINGS

FIG. 3 is a flowchart for illustrating operations of generating an electronic document file in the embodiment of the digitizing apparatus according to the present disclosure;

DETAILED DESCRIPTION

Figure 1:
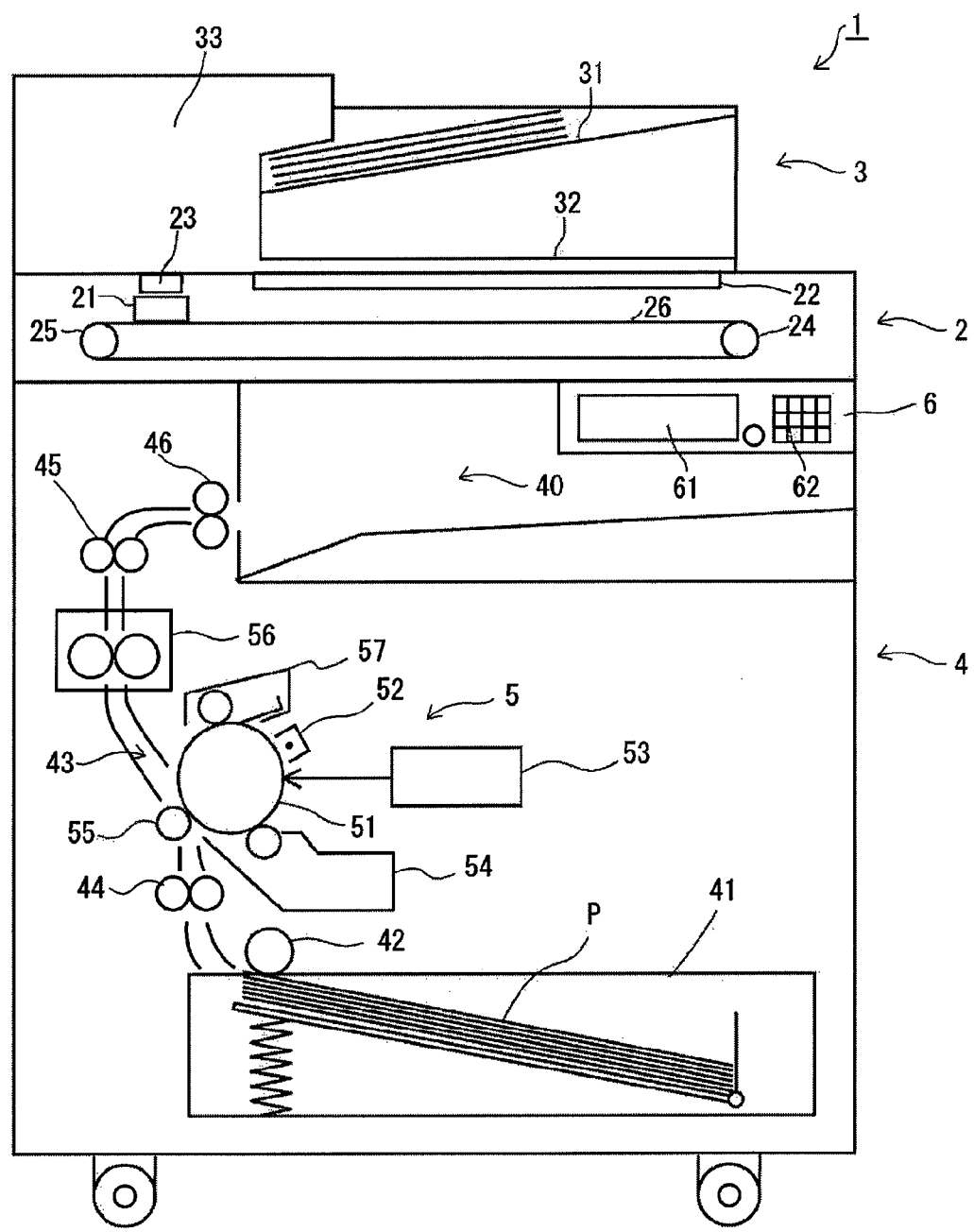
FIG. 1 is a schematic cross-sectional view showing an internal configuration of a digitizing apparatus according an embodiment of the present disclosure.

Next, specific descriptions are provided for an embodiment of the present disclosure with reference to the drawings. A digitizing apparatus of the present embodiment is a copying machine (image forming apparatus) 1 that utilizes an electrophotographic method. With reference to FIG. 1, the copying machine 1 includes an original reading unit 2, an original feeder 3, a main body unit 4, and an operation unit 6. The original feeder 3 is disposed on an upper portion of the original reading unit 2. The original reading unit 2 is disposed on an upper portion of the main body unit 4. A paper discharge space 40 is formed between the original reading unit 2 and the main body unit 4. The digitizing apparatus of the present embodiment is described as the copying machine 1; however, the digitizing apparatus of the present disclosure is not limited thereto, and includes a scanner, a multifunction peripheral, etc.

The operation unit 6 includes a liquid crystal display unit 61 and operation buttons 62. By inputting various instructions by operating the operation unit 6, the user performs various settings of the copying machine 1, and executes various functions such as scanning and/or forming an image. The liquid crystal display unit 61 displays a state of the copying machine 1, and displays an image formation status and a number of print copies. The liquid crystal display unit 61 also functions as a touch screen, and is capable of functions such as duplex printing and monochrome inverted printing, and various settings such as a scale factor setting and a darkness/lightness setting. The operation buttons 62 include, for example, a start button for instructing initiation of a scanning operation or image formation, a stop button for instructing suspension of a scanning operation or image formation, a reset button for resetting the various settings of the copying machine 1 to a default state, numeric keypads for inputting the number of sheets to be printed, etc.

The original reading unit 2 includes a scanner 21, a platen glass 22, and an original reading slit 23. The scanner 21 introduces light from a light source such as a cold cathode tube lamp to an image plane of an original, and introduces the light reflected from the image plane to an image capturing element such as a CCD sensor. The scanner 21 is fixed on a toothed belt 26 that is extended between a pulley 24 and a pulley 25 that are connected to a motor (not shown). When the motor is driven, the scanner 21 is moved along the image plane of the original placed on the platen glass 22, thereby scanning the image plane of the original. The platen glass 22 is composed of a transparent member such as glass. The original reading slit 23 is formed in a direction orthogonal to a direction of feeding the original by an original feeder 3.

In a case in which the original reading unit 2 reads an original that is placed on the platen glass 22, the original reading unit 2 acquires image data by scanning the original placed on the platen glass 22 for each line in the main scanning direction, while moving the scanner 21 in a sub-scanning direction along the platen glass 22; and the original reading unit 2 outputs the acquired image data to the main body unit 4. In a case in which the original reading unit 2 reads an original that is fed by the original feeder 3, the original reading unit 2 moves the scanner 21 to a position facing the original reading slit 23, acquires image data by reading the original through the original reading slit 23 in synchronization with the operation of feeding the original by the original feeder 3, and outputs the acquired image data to the main body unit 4.

The original feeder 3 includes an original mounting unit 31, an original discharge unit 32, and an original conveying mechanism 33. When originals are placed in the original mounting unit 31, the original conveying mechanism 33 sequentially feeds the originals on a sheet by sheet basis so as to be conveyed to the position facing the original reading slit 23, and discharges the originals to the original discharge unit 32 thereafter. The original feeder 3 is configured to be openable and closable in relation to the original reading unit 2, and a top face of the platen glass 22 can be exposed by lifting up the original feeder 3.

The main body unit 4 includes a recording unit 5 that applies record data on a recording sheet of paper P through an electrophotographic process. The main body unit 4 includes a sheet supply cassette 41, a sheet supply roller 42, a sheet conveyance path 43, conveyance rollers 44 and 45, and a discharge roller 46. The sheet supply roller 42, the conveyance rollers 44 and 45 and the discharge roller 46 function together as a conveyance unit that conveys the recording sheets of paper P. The recording sheets of paper P stored in the sheet supply cassette 41 are fed to the conveyance path 43 on a sheet by sheet basis by the sheet supply roller 42, and are conveyed to the recording unit 5 by the conveyance roller 44. The recording sheets of paper P, to which the record data has been applied by the recording unit 5, are discharged to the paper discharge space 40 by the discharge roller 46.

The recording unit 5 includes a photosensitive drum 51, a charging unit 52, an optical scanning unit 53, a developing unit 54, a transfer roller 55, a fixing unit 56, and a cleaning unit 57. The recording unit 5 executes the image formation process as follows. Firstly, the charging unit 52 uniformly charges a surface of the photosensitive drum 51, and the optical scanning unit 53 scans the surface of photosensitive drum 51, based on the image data read by the original reading unit 2; as a result, an electrostatic latent image is formed. Subsequently, the developing unit 54 develops the electrostatic latent image that is formed on the surface of photosensitive drum 51; and as a result, a toner image is formed. While the recording sheet of paper P fed from the sheet supply cassette 41 passes through a nip portion between the photosensitive drum 51 and the transfer roller 55, the toner image formed on the surface of photosensitive drum 51 is transferred onto the recording sheet of paper P. The toner image transferred onto the recording sheet of paper P is heat-fixed to the recording sheet of paper P while the recording sheet of paper P passes through the fixing unit 56.

Figure 2:
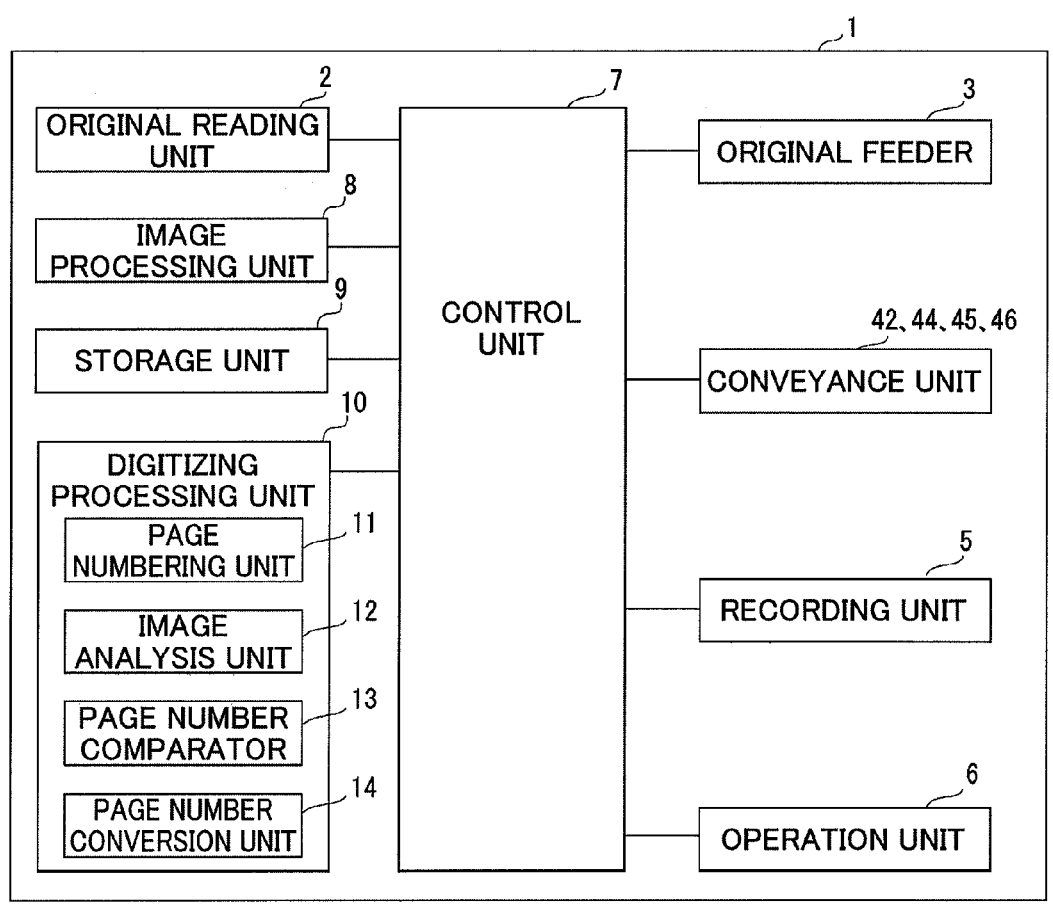
FIG. 2 is a block diagram showing a schematic configuration of the digitizing apparatus shown in FIG. 1.

FIG. 2 is a block diagram showing a schematic configuration of the copying machine 1. A control unit 7 is connected to the original reading unit 2, the original feeder 3, the conveyance unit (the sheet supply roller 42, the conveyance rollers 44 and 45, and the discharge roller 46), the recording unit 5 and the operation unit 6. The control unit 7 controls operations of these members. The control unit 7 is connected to an image processing unit 8, a storage unit 9, and a digitizing processing unit 10.

The control unit 7 is an information processing unit such as a microcomputer including ROM (Read Only Memory), RAM (Random Access Memory), etc. The ROM stores a control program for controlling operations of the copying machine 1. The control unit 7 reads the control program stored in the ROM, and deploys the control program in the RAM, thereby controlling the entire apparatus in accordance with predetermined instruction information that is input from the operation unit 6.

The image processing unit 8 executes predetermined image processing on image data. The image processing is, for example, image improvement processing such as scaling processing, gray scale adjustment, and darkness/lightness adjustment.

The storage unit 9 is a storage unit such as semiconductor memory or an HDD (Hard Disk Drive). The storage unit 9 stores image data acquired by reading an original by the original reading unit 2, and stores a variety of management information.

The digitizing processing unit 10 is an electronic document file generation unit that generates an electronic document file by compiling image data, which is a plurality of pages being read by the original reading unit 2 and stored in the storage unit 9, into a single file. The digitizing processing unit 10 includes a page numbering unit 11, an image analysis unit 12, a page number comparator 13, and a page number conversion unit 14.

The page numbering unit 11 assigns serial numbers, as electronic document page numbers starting from page one in the order of reading by the original reading unit 2, to the image data of the plurality of pages that are read by the original reading unit 2 and stored in the storage unit 9.

The image analysis unit 12 has an optical character recognition function, and analyzes each of the image data of the plurality of pages that are read by the original reading unit 2 and stored in the storage unit 9. As a result, the image analysis unit 12 classifies the plurality of pages into any of a cover page, a table-of-content page, or ordinary pages, and extracts page numbers described in the image data of the ordinary pages.

The page number comparator 13 compares the electronic document page number assigned by the page numbering unit 11 with the page number extracted by the image analysis unit 12 for each of the ordinarily pages, and notifies the page number conversion unit 14 of the result of comparison.

The page number conversion unit 14 has a function of deleting data of a predetermined area in the image data, and a function of generating a numeric font and adding the generated numeric font to the image data. The page number conversion unit 14 executes ordinary page conversion processing, based on the result of comparison by the page number comparator 13. In the ordinary page conversion processing, in a case in which the page number extracted by the image analysis unit 12 is different from the electronic document page number assigned by the page numbering unit 11, the page number in the image data is converted into the electronic document page number assigned by the page numbering unit 11. More specifically, the page number conversion unit 14 deletes data of an area describing the page number in the image data, generates a numeric font of the electronic document page number assigned by the page numbering unit 11, and adds the generated numeric font to the area, from which the data has been deleted. The page number conversion unit 14 executes table-of-content page conversion processing, based on the result of comparison by the page number comparator 13 (i.e. based on the result of converting the ordinary pages). In the table-of-content page conversion processing, page numbers for searching described in the image data of the table-of-content page are converted into the electronic document page numbers converted by the ordinary page conversion processing.

Next, with reference to FIGS. 3 to 6, detailed descriptions are provided for operations of generating an electronic document file in the present embodiment.

Figure 4A:
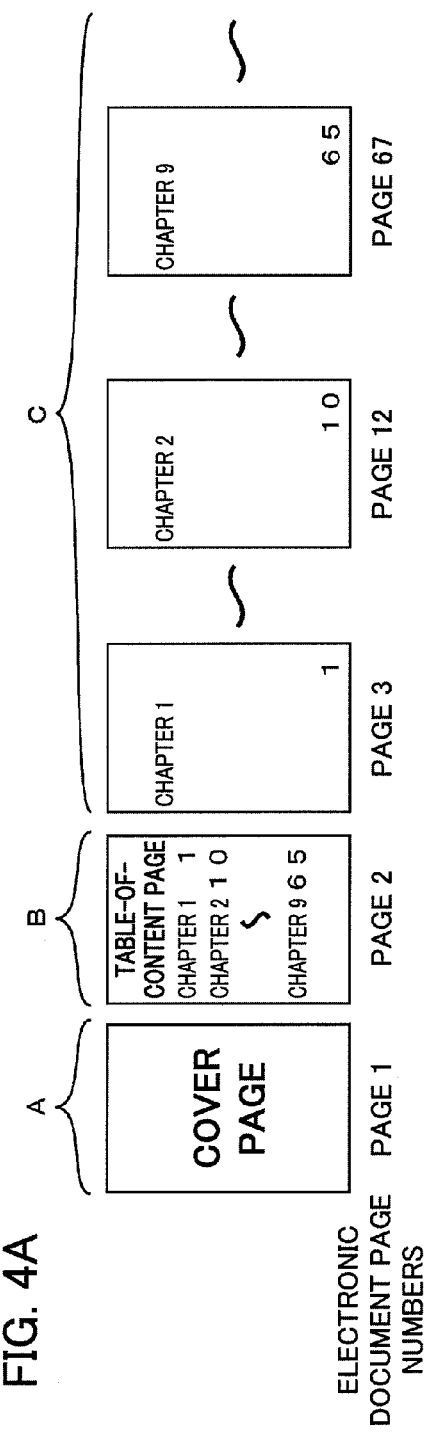
FIGS. 4A and 4B are explanatory diagrams for illustrating operations of generating an electronic document file in the embodiment of the digitizing apparatus according to the present disclosure.

In a case in which originals of a plurality of pages are digitized, the user sets the originals of the plurality of pages to be digitized in the original mounting unit 31 of the original feeder 3, and inputs a digitizing instruction via the operation unit 6. When the digitizing instruction is input via the operation unit 6, the original feeder 3 sequentially feeds the originals of the plurality of pages to be conveyed to the position facing the original reading slit 23, on a sheet by sheet basis. The original reading unit 2 reads the originals through the original reading slit 23, in synchronization with the operations of conveying the originals by the original feeder 3 (Step A1). The image data of the plurality of pages read by the original reading unit 2 is stored into the storage unit 9 (Step A2). FIG. 4A shows an example of image data of a plurality of pages consisting of a cover page A, a table-of-content page B, and ordinary pages C, which are read by the original reading unit 2 and stored in the storage unit 9. In the example shown in FIG. 4A, page numbers indicating pages per se are not described in the image data of the cover page A and the table-of-content page B, and page numbers are described only in the image data of the ordinary pages C. The table-of-content page B is a search page that describes page numbers for searching for other pages. The image data of the table-of-content page B describes a plurality of page numbers for searching.

Subsequently, as shown in FIG. 4, the page numbering unit 11 of the digitizing processing unit 10 executes the page numbering processing on the image data of the plurality of pages stored in the storage unit 9 (Step A3). In the page numbering processing, serial numbers starting from page one are assigned as electronic document page numbers in the order of the reading by the original reading unit 2.

Figure 5B:
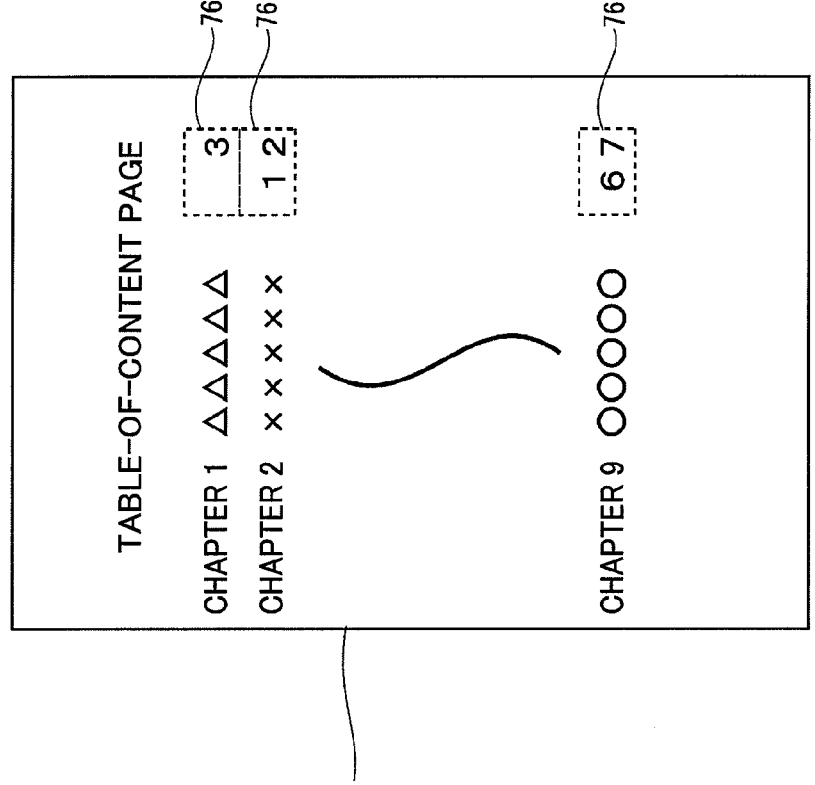
FIGS. 5A and 5B are explanatory diagrams for illustrating operations of processing on a table-of-content page shown in FIGS. 4A and 4B.
Figure 5A:
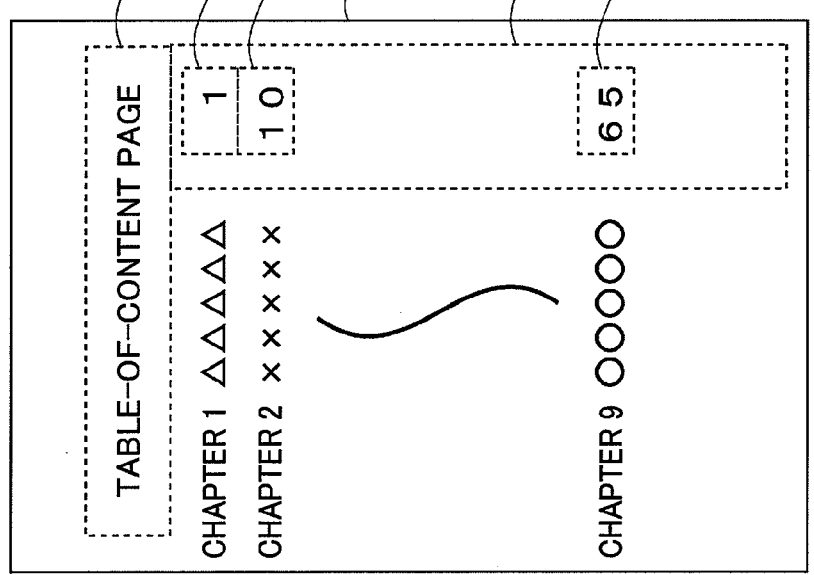

Subsequently, the image analysis unit 12 executes classification processing (Step A4). In the classification processing, the optical character recognition function analyzes each of the image data of the plurality of pages that are read by the original reading unit 2 and stored in the storage unit 9, thereby classifying the plurality of pages into any of the cover page A, the table-of-content page B, or the ordinary pages C. The image analysis unit 12 functions as a table-of-content page identification unit for identifying the table-of-content page B, and identifies the table-of-content page B from the image data of the plurality of pages stored in the storage unit 9. The image analysis unit 12 functions as an ordinary page identification unit for identifying the ordinary pages C, identifies pages after the table-of-content page B as the ordinary pages C, and classifies the page before the table-of-content page B as the cover page A. As shown in FIG. 5A, in a case in which the original is horizontally written, the table-of-content page B can be identified if an upper side area 71 includes a character string indicating the table-of-content page B, or if an end-of-line area 72 located on the right side includes vertically and consecutively described numeric characters (page numbers for searching for the ordinary pages C).

Figure 6B:
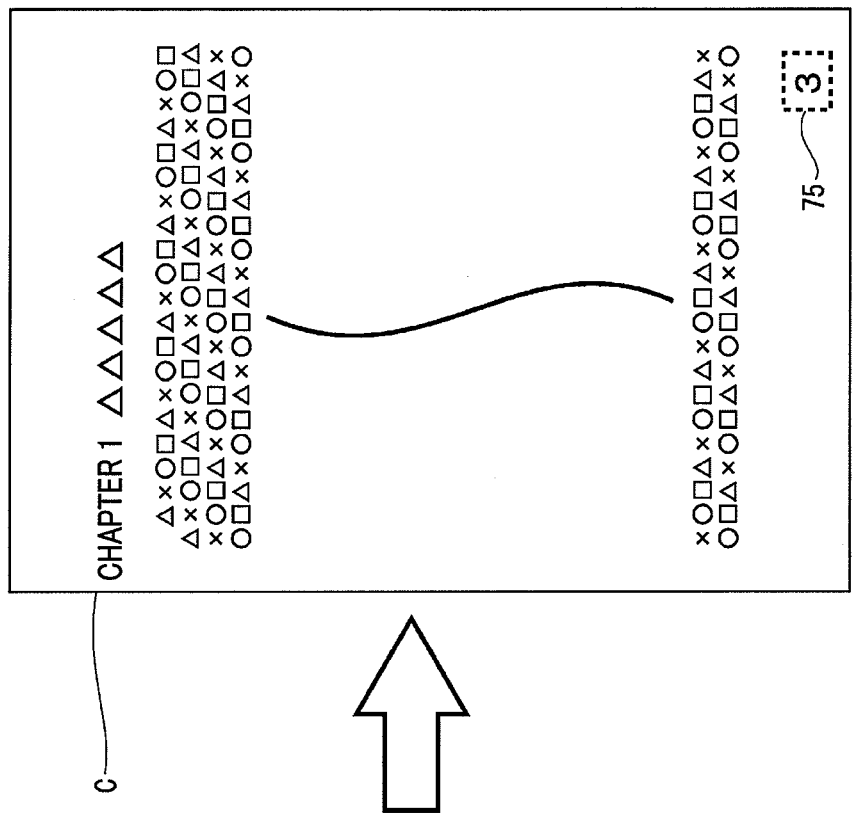
FIGS. 6A and 6B are explanatory diagrams for illustrating operations of processing on an ordinary page shown in FIGS. 4A and 4B.
Figure 6A:
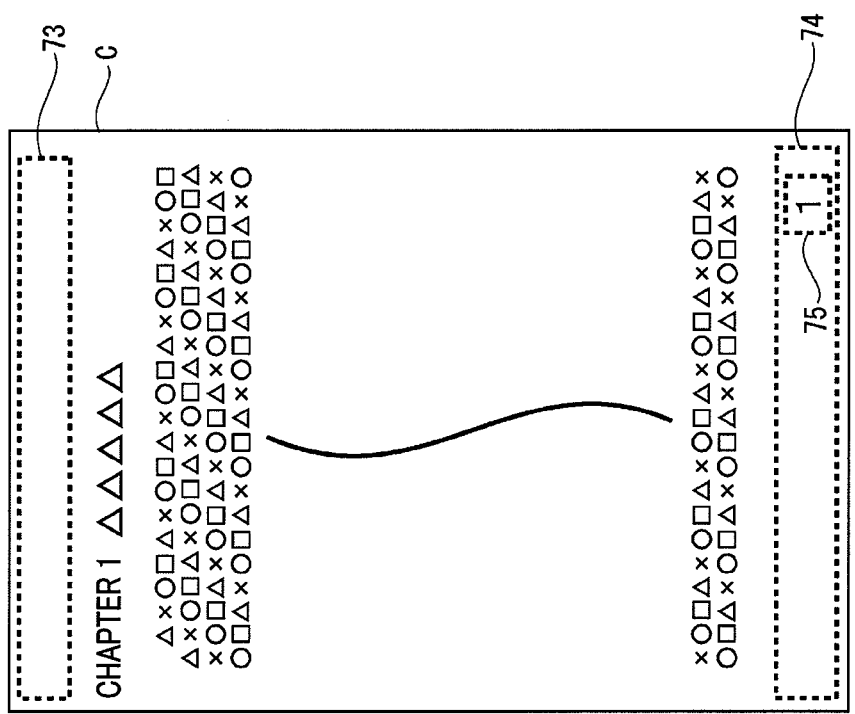

In a case in which the original is vertically written, the table-of-content page B can be identified if a right side area includes a character string indicating the table-of-content page B, or if the end-of-line area 72 located on the bottom side includes horizontally and consecutively described numeric characters. The table-of-content page B may be designated through an input from the operation unit 6. As shown in FIG. 6A, the ordinary page C with a page number described in the image data can be identified if a numeric character(s) is described in a header area 73 or a footer area 74.

Subsequently, the image analysis unit 12 extracts page numbers described in the image data of the ordinary pages C (Step A5). In the table-of-content page B, the numeric characters described in the end-of-line area 72 shown in FIG. 5A are extracted as the page numbers for searching. In the ordinary page C, the numeric character string described in the header area 73 or the footer area 74 shown in FIG. 6A is extracted as the page number thereof.

Subsequently, in the ordinary page C, the page number comparator 13 executes page number comparison processing (Step A6) to compare the electronic document page number assigned in Step A3 with the page number extracted in Step A5, and notifies the page number conversion unit 14 of the result of comparison. As a result of the page number comparison processing, the page number (the page number for searching) described in the image data is associated with the electronic document page number assigned to the image data.

Figure 4B:
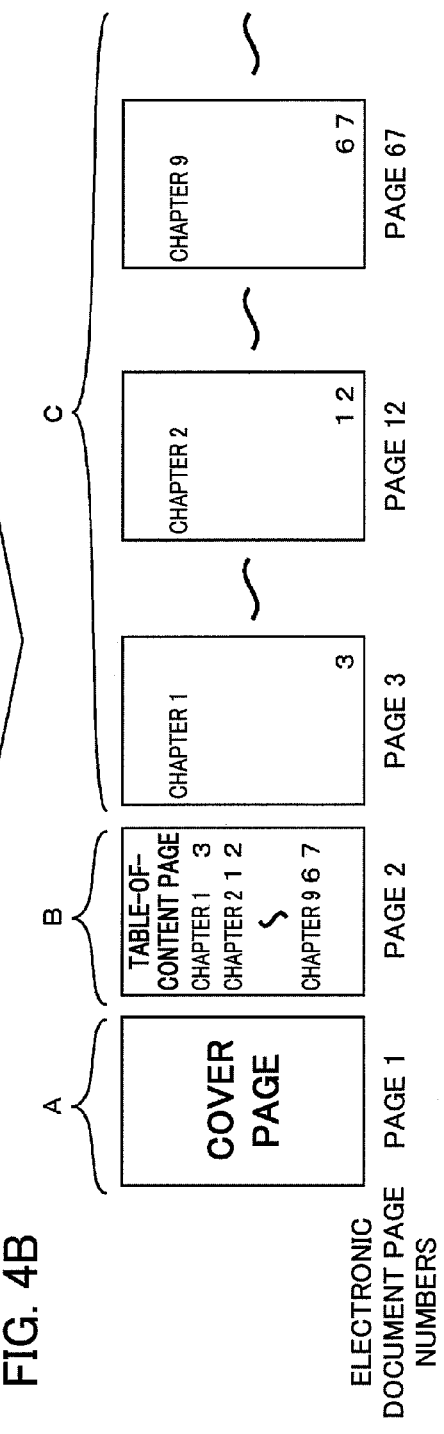

Subsequently, the page number conversion unit 14 executes the ordinary page conversion processing (Step A7), based on the result of comparison by the page number comparator 13. In the ordinary page conversion processing, in a case in which the page number extracted by the image analysis unit 12 is different from the electronic document page number assigned by the page numbering unit 11 in the ordinary page C, the page number in the image data is converted into the electronic document page number assigned by the page numbering unit 11. In the ordinary page conversion processing, as shown in FIG. 6A, data in a page number description area 75 describing a page number is deleted from the image data of the ordinary page C, a numeric font of the electronic document page number corresponding to the page number is generated, and the generated numeric font is added to the page number description area 75, from which the data has been deleted, as shown in FIG. 6B. As a result of the ordinary page conversion processing, as shown in FIG. 4B, the page numbers in the image data of the ordinary pages C become consistent with the electronic document page numbers assigned to the ordinary pages C, respectively, in Step A3.

Subsequently, the page number conversion unit 14 executes table-of-content page conversion processing (Step A8), based on the result of comparison by the page number comparator 13 (i.e. based on the result of converting the ordinary pages C). In the table-of-content page conversion processing, the page numbers for searching described in the image data of the table-of-content page B are converted into the corresponding electronic document page numbers. As shown in FIG. 5A, in a case in which the page numbers for searching described in the image data of the table-of-content page B are not consistent with the electronic document page numbers assigned by the page numbering unit 11, the table-of-content page conversion processing deletes data in page-number-for-searching description areas 76 describing the page numbers for searching in the image data of the table-of-content page B, and generates numeric fonts of the corresponding electronic document page numbers in place of the page numbers for searching that were described. As shown in FIG. 5B, the table-of-content page conversion processing adds the generated numeric fonts to the page-number-for-searching description areas 76, from which the data has been deleted. As shown in FIG. 4B, as a result of the table-of-content page conversion processing, the page numbers for searching described in the image data of the table-of-content page B become consistent with the electronic document page numbers assigned to the ordinary pages C in Step A3.

Finally, the digitizing processing unit 10 generates an electronic document file (for example, a PDF file) by compiling the image data of the plurality of pages being stored in the storage unit 9 into a single file (Step A9), and stores the generated electronic document file into the storage unit 9. The electronic document file that is generated in this manner is output via a network and/or a removable storage medium (not shown), and is provided so as be accessible with a Personal Digital Assistance such as a cellular telephone device or a notebook PC.

In the configuration of the present embodiment, for the purpose of generating an electronic document file, the page numbering processing, the classification processing, the page number extraction processing, the page number comparison processing, the ordinary page conversion processing, and the table-of-content page conversion processing are executed after reading all the originals of the plurality of pages; however, the present disclosure is not limited thereto. Each processing may be executed in parallel with the reading of the originals.

The present embodiment has been described by taking an example in which the table-of-content page B is identified as a search page near the beginning of the volume; however, the present disclosure is not limited thereto. A configuration may be employed to identify an index page as a search page near the end of a book, and the page numbers for searching described in the index page may be converted into corresponding electronic document page numbers. In this case, in a method similar to the method of identifying the table-of-content page B, the index page may be identified near the end of the book, and the pages before the identified index page may be classified as the ordinary pages C. The present embodiment is configured such that the image analysis unit 12 analyzes characteristics of the table-of-content page B to identify the table-of-content page B; however, the present disclosure is not limited thereto. The table-of-content page B may be identified through an input from the operation unit 6.

The present embodiment is configured so as to generate an electronic document file from the image data of the plurality of pages that are read by the original reading unit 2; however, the present disclosure is not limited thereto. The image data of the plurality of pages may not necessarily be read from originals. For example, an electronic document file may be generated from image data that is read by another device.

According to the present embodiment as described above, the page numbering unit 11 of the digitizing processing unit 10 assigns electronic document page numbers to the image data of the plurality of pages, respectively, stored in the storage unit 9. The image analysis unit 12 extracts the page numbers described in the image data of the plurality of pages stored in the storage unit 9, and identifies image data that describes page numbers for searching for other pages, from the image data of the plurality of pages stored in the storage unit 9. The page number comparator 13 compares the assigned electronic document page number with the extracted page number, for each of the image data of the plurality of pages. Based on the result of comparison by the page number comparator, the page number conversion unit 14 converts the page numbers for searching described in the image data into the corresponding electronic document page numbers. With this configuration, the page numbers for searching described in a search page such as the table-of-content page B are converted into the electronic document page numbers without being manually input by the user. Therefore, it is possible to generate an electronic document file, in which pages can be easily searched for when browsing the file by referring to a search page such as the table-of-content page B. As shown in FIG. 4A, in the image data that has been read without conversion, the page numbers for searching described in the table-of-content page B are not consistent with the electronic document page numbers, respectively, and a desired page cannot be searched for by referring to the table-of-content page B. Accordingly, as shown in FIG. 4B, in the present embodiment, the electronic document page numbers are described as the page numbers for searching in the table-of-content page B; therefore, a desired page can be easily searched for by referring to the table-of-content page B.

According to the present embodiment, the page number conversion unit 14 converts the page numbers described in the image data into the corresponding electronic document page numbers, based on the result of comparison by the page number comparator 13. With this configuration, the electronic document page numbers can be consistent with the page numbers described in the image data, respectively.

The present disclosure is not limited to respective embodiments described above. Each embodiment can be modified as appropriate within the scope of the technical concept of the present disclosure.

The invention claimed is:

1. A digitizing apparatus that generates an electronic document file by compiling image data of a plurality of pages including a cover page, table-of-content page and ordinary page into a single file, the apparatus comprising:
   a page numbering unit that assigns an electronic document page number to each of the image data of the plurality of pages;
   a page number extraction unit that classifies the image data of the plurality of pages into any of the cover page, table-of-content page and ordinary page and extracts a page number described in each of the image data of the plurality of pages;
   a page number comparator that compares the electronic document page number assigned by the page numbering unit with the page number extracted by the page number extraction unit, for each of the image data of the plurality of pages;
   a search page identification unit that identifies image data of the table-of-content page representative of searching page numbers to search for other pages, from among the image data of the plurality of pages; and
   a page number conversion unit configured to perform ordinary page conversion processing and table-of-content page conversion processing,
   wherein in a case of the ordinary page conversion processing, the page number conversion unit is configured to delete the page number at a page number description area of image data of the ordinary page when the electronic document page number assigned by the page numbering unit differs from the page number extracted by the page number extraction unit, and to generate a numeric font of the electronic document page number corresponding to the page number according to a result of comparison performed by the page number comparator, such that the page number at the page number description area is converted into the corresponding electronic document page number by adding the generated numeric font to the page number description area where the page number has been deleted, and wherein in a case of the table-of-content page conversion processing, the page number conversion unit is configured to delete data at a page-number-for-searching description area in the image data of the table-of-content page and to generate a numeric font of the electronic document page number corresponding to the searching page number according to the result of comparison performed by the page number comparator, such that the searching page number is converted into the corresponding electronic document page number by adding the generated numeric font to the page-number-for-searching description area where the searching page number has been deleted, for a case where the electronic document page number assigned by the page numbering unit is inconsistent with the searching page number at the page-number-for-searching description area.

2. The digitizing apparatus according to claim 1, wherein the search page identification unit identifies image data, which includes a character string indicating a table-of-content page, as the table-of-content page, from among the image data of the plurality of pages.

3. The digitizing apparatus according to claim 1, wherein the search page identification unit identifies the image data, in which the searching page numbers exist vertically and consecutively in an end-of-line area, or in which the searching page numbers exist horizontally and consecutively in an end-of-line area, as the table-of-content page, from among the image data of the plurality of pages.

4. The digitizing apparatus according to claim 1, further comprising:
an operation unit,
wherein the search page identification unit identifies a page, which is designated by an input from the operation unit, as the table-of-content page.

5. The digitizing apparatus according to claim 1, further comprising:
an original reading unit,
wherein the page numbering unit assigns serial numbers starting from 1, in order of reading originals, as electronic document page numbers, to the image data that are read by the original reading unit.

* * * * *